United States Patent [19]

Walley

[11] Patent Number: 5,061,081
[45] Date of Patent: Oct. 29, 1991

[54] MIXER UNIT/VEHICLE

[76] Inventor: Charles E. Walley, Cotton Abbots, Waverton, Chester Cheshire CH3 7PH, England

[21] Appl. No.: 615,877

[22] Filed: Nov. 20, 1990

[30] Foreign Application Priority Data

Nov. 21, 1989 [GB] United Kingdom ............... 8926254
Oct. 10, 1990 [GB] United Kingdom ............... 9022069

[51] Int. Cl.$^5$ .............................................. B01F 7/02
[52] U.S. Cl. ..................................... 366/196; 366/299; 366/603; 414/526
[58] Field of Search ............... 366/603, 297, 298, 299, 366/300, 184, 194, 195, 196, 279, 66; 222/564, 238; 414/526, 326, 502

[56] References Cited

U.S. PATENT DOCUMENTS

| | | | |
|---|---|---|---|
| 3,672,640 | 6/1972 | Crose | 366/300 |
| 4,212,574 | 7/1980 | Dreier | 414/502 |
| 4,298,289 | 11/1981 | Walley | 366/298 |
| 4,597,672 | 7/1986 | Neier et al. | 366/603 |
| 4,784,081 | 11/1988 | Knott | 222/564 |

Primary Examiner—Harvey C. Hornsby
Assistant Examiner—Reginald L. Alexander
Attorney, Agent, or Firm—Learman & McCulloch

[57] ABSTRACT

Mixing apparatus, typically a tractor powered agricultural trailer for mixing and dispensing animal feedstuffs, has a main body in which a main mixing rotor rotates for agitating and stirring the material which it sweeps round lower part-cylindrical wall structure of the body and a lateral extension along an upper side of the main body having a feed out rotor therein for urging the material to and through a discharge door in said extension. The inboard side of the extension is open to the main part of the body and said wall structure includes a part bounding the bottom of the extension which can be moved angularly between a first position close to the envelope of revolution of the mixing rotor to deflect material from entering the extension during mixing and a second position at which it is remote from said envelope so that material is swept into the extension during discharge.

8 Claims, 2 Drawing Sheets

MIXER UNIT/VEHICLE

This invention relates to apparatus for mixing and dispensing bulk materials, particularly animal feed stuffs, typically but not exclusively in the form of a vehicle, e.g. a trailer to be towed by and powered from an agricultural tractor, for use in mixing silage or other fodder, meal, concentrates and/or other feed stuffs in predetermined proportions and for dispensing the mix e.g. into cattle feed troughs. The vehicle or other apparatus may incorporate weighing means in known manner.

The apparatus may also be static in use, where mixed materials are stored, or where time is required before the mixed materials can be fed.

It is known to provide an agricultural mixing trailer having an open topped body for loading by way of an upper zone thereof and a part cylindrical lower zone defined by a curved floor and wall structure centered on a first longitudinal axis of the vehicle, said body having a main mixing rotor rotatably driven about said longitudinal axis in a cylindrical envelope of revolution in close proximity to the said floor and wall structure to provide a tumbling, stirring or mixing action within the body; a laterally projecting extension to one side of an upper part of the body above the level of said axis on the side at which material is operatively driven upwardly by the mixing rotor; a feed out rotor within said extension to act on material passing into the latter; and a discharge opening in or along said extension which can be selectively opened to permit dispensing of material from the extension under the action of the feed out rotor to one side of the direction of travel of the vehicle in use, and apparatus constructed and operating in the manner of said vehicle is hereinafter referred to as "mixing apparatus of the kind described".

Examples of mixer vehicles being apparatus of the kind described are detailed in GB-B-2035822 and GB-B-2139911.

The object of the invention is to provide a mixer vehicle or other mixing apparatus of the kind described which is particularly simple, reliable and effective in operation, which is of simple and economical construction, and which is durable and trouble free in use.

According to the invention there is provided mixing apparatus of the kind described wherein the inboard side of said extension is permanently open to the body in a longitudinal zone thereof (which zone may or may not extend the full length of the body) in which zone material is transferred from the body into the extension under the action of the mixing rotor during discharge from said opening under the action of the feed out rotor; characterised in that a portion of said body wall structure in said zone and having an upper edge portion immediately adjacent to the bottom of the extension is selectively angularly movable between a first position in close proximity to the envelope of revolution of the mixing rotor and a second position at which it is more remote from said envelope, whereby with said portion at the first position material swept round the body by the mixing rotor is substantially directed past the extension and out of reach of the feed out rotor so that it remains in a main part of the body for further mixing, and at the second position said material is substantially urged into the extension and towards the feed out rotor to be acted on thereby.

Conveniently said body wall portion is a deflector plate pivoted or otherwise located for angular movement about an axis coincident with or constituted by its lower edge, the latter being mounted so that its inner face lies flush with the remainder of the body wall therebelow.

Said deflector plate may include a laterally projecting lip which overlies the margin of a floor portion of the extension at both positions to resist escape of material at the junction with said floor.

It is also contemplated that said body wall portion could be constituted by an integral part of the main body wall which is flexed to effect said movement.

While the feed out rotor may play a part in the mixing process it is contemplated that its main purpose will be to impel material through the discharge opening as or after mixing is completed and when the material is to be selectively dispensed from the body. In this case the said body wall portion would only be moved to the second position as and when discharge is to take place e.g. as or when the discharge opening is opened.

It will be noted that the invention avoids the need to provide a sliding or other controlled door or gate between the main body and the extension with consequent complications of construction and extra weight.

The mixing rotor will preferably operate on the material without any substantial component of longitudinal movement or transfer of the material from or towards one or other ends of the body to avoid any tendency for bunching or jamming of the material therein. With such arrangement it is necessary that the extension opens to the body along the full length thereof whereas it is often desirable that the discharge opening extends along only a part of the extension length, thus the feed out rotor has to transfer the material longitudinally to said opening when dispensing is talk place. This makes it desirable that no substantial bulk of the material enters the extension while the discharge opening is closed as said transferring action would again cause bunching and concentration of material along the extension. The provision of a vertically sliding door or doors opening upwardly or downwardly between the extension and the main body is not easy to accommodate while maintaining a convenient height of discharge opening without either increasing the overall height of the vehicle (to accommodate an upwardly opening door and its mechanism) which may make operation in low roofed stockyards or sheds difficult, and/or with the problem of accommodating a downwardly opening door and its mechanism along the side of the body exterior below the extension with adequate sealing to prevent leakage and wastage of material. Moreover such doors are liable to jamming due to lodgement of material and/or any accidental distortion or bending in operation. The use of the invention avoids these problems.

To further avoid unwanted entry of a bulk of the material into the the extension or some part thereof until mixing has been effected and discharge is to take place, the apparatus preferably further includes a roof panel of the extension operatively mounted within the body over the feed out rotor and angled to slope downwardly towards the mixing rotor. This panel guides the material into the main part of the body clear of the feed out rotor during loading, and also helps in preventing material entering the extension during mixing e.g. if lumps or clods are raised by the main rotor to fall sideways as they reach the top of their travel. Said roof panel may extend over the full length of the feed out rotor, or only part thereof. In the latter case it will preferably extend over at least any part of said rotor which is in the form of an auger or otherwise adapted to transfer material longitudinally of the extension in use.

An embodiment of the invention will now be more particularly described with reference to the accompanying drawings wherein.

Figure 1:
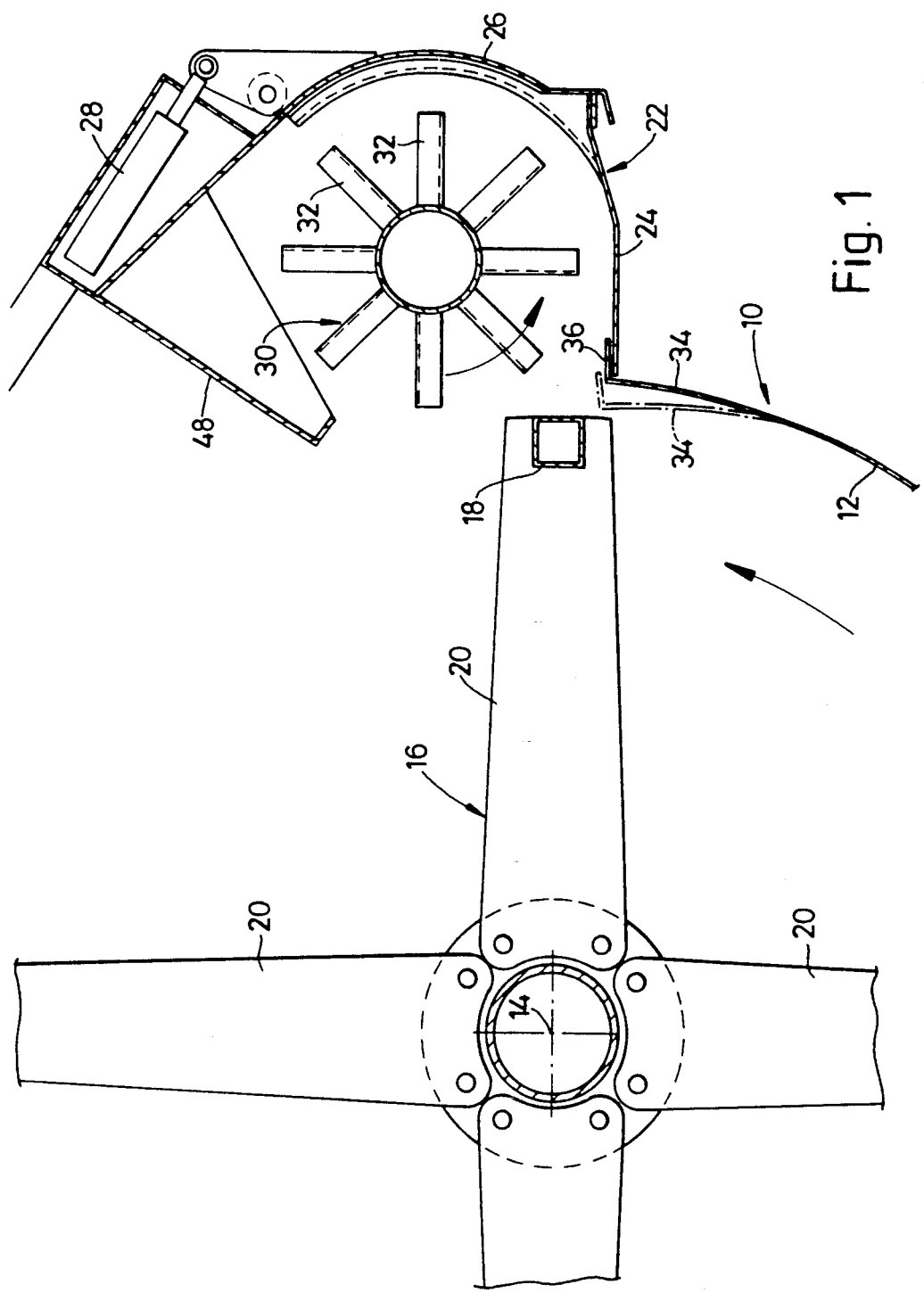
FIG. 1 is a lateral sectional view of a portion of a mixer vehicle.

This example of apparatus of the invention is embodied in a two wheel tractor drawn mixer trailer vehicle powered from the tractor PTO and having a non-tipping body 10 (part only shown in the drawings). Body 10 has an open top and a part cylindrical lower zone defined by a curved floor 12 centered on a longitudinal main axis 14.

A main mixing rotor 16 (FIG. 1) is journalled in the ends of the body centered on axis 14 and operatively driven anti-clockwise as viewed in FIG. 1, longitudinal agitator bars 18 carried at the extremities of spokes 20 thereof travelling in a cylinder of revolution in close proximity to the inner face of curved wall 12 to provide a mixing action within body 10 in known manner, material being swept upwardly along that portion of wall 12 shown in the drawings.

A laterally projecting body extension 22 has a generally horizontal floor 24 which is just below the level of axis 14. The extension extends the full length of body 10 and is provided with a selectively operable discharge door 26 along its outer side hinged to open outwardly on actuation by a hydraulic double acting door ram 28.

For some application the discharge opening controlled by door 26 may extend the full length of the body but it is preferred that it occupies only a portion of said length e.g. towards one end thereof (e.g. the front end) so that the discharge therefrom is more concentrated.

A feed out rotor 30 centered within extension 22 and extending the full length thereof is journalled on a longitudinal axis and driven in common with mixing rotor 16 in the same direction of rotation but at a higher speed.

Feed out rotor 30 includes paddles 32 on the portion co-extensive with door 26 acting to impel material entering the extension from the main body laterally outwardly for discharge from the opening. If door 26 does not extend the full length of the extension, feed out rotor 30 will also include one or more auger formations (not shown) pitched to transfer material within the extension longitudinally to feed it to the door opening.

Figure 2:
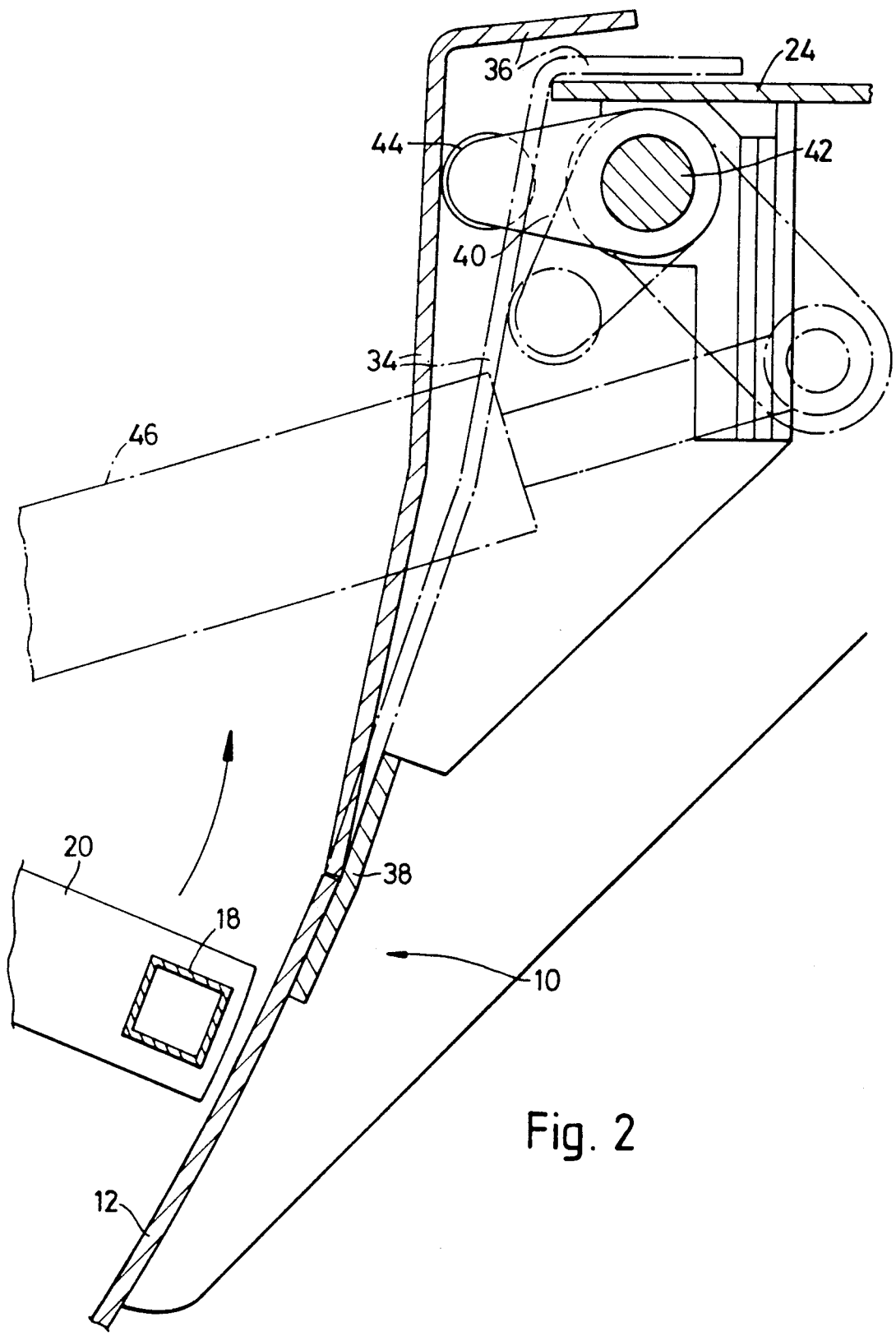
FIG. 2 is an enlarged detail of a movable body wall portion of said vehicle.

The uppermost and near vertical portion of wall 12 which adjoins the bottom of extenesion 22 is in the form of a movable deflector plate 34 co-extensive with the extension i.e. along the full length of body 10. The upper edge of plate 34 is flanged to provide a generally horizontal outward projection or lip 36 overlying the inner edge of the extension floor 24. The lower edge of plate 34, best seen in FIG. 2, lies flush with the adjoining lower part of wall 12 and is seated against an extenral strip 38 attached to and projecting above said lower portion so that plate 34 fulcrums on said edge for angular movement between the positions shown by full and broken lines in the drawings.

Said movement is effected, in this example, by a series of camming levers 40 (one only shown) spaced longitudinally on a cam shaft 42 journalled immediately below floor 24 (FIG. 2) i.e. externally of the body. A distal end of each lever 40 carries a roller 44 which urges the upper part of plate 34 inwards when shifted to the upper position shown in full lines in FIG. 2. Shaft 42 is operated by a double acting hydraulic ram 46 conveniently carried outside one end of the body, its position being indicated diagrammatically in broken lines in FIG. 2.

With plate 34 shifted to a first position being its innermost position (i.e. to the left as viewed in the drawings) said plate will be in close proximity to the cylinder of revolution of the mixing rotor 16 so that material swept upwardly thereby during mixing will be diverted away from extension 22 and no substantial part thereof will enter the latter to be acted on by the feed out rotor 30, which also rotates during the mixing process. Thus the material is retained in the main part of body 10 to be fully acted on by the mixing rotor for thorough mixing and, particularly where the feed out rotor 30 is provided with auger formations for longitudinal transfer of material, there is no action causing the material to be substantially transferred longitudinally of the body which would cause uneven mixing and bunching and congestion in one region thereof, e.g. at one or other end, and which might cause overloading and jamming of feed out rotor 30.

As or when mixing is completed and the vehicle has been positioned for dispensing the mix, e.g. of animal feed stuffs, the discharge door 26 will be opened and at the same time plate 34 will be angularly moved to the second position i.e. its outermot position (to the right as viewed in the drawings). As the mixing rotor continues to rotate the material will be swept upwardly to pass over the top edge of plate 34 so that it spills laterally over lip 36 onto the floor 24 of the extension, at the same time it is acted on by the feed out rotor which impels it to and through the discharge opening e.g. into animal feed throughs as the vehicle is driven therealong.

The construction described is particularly simple and durable, is not liable to jamming due to accumulation of material, does not add substantially to the overall dimensions, size, bulk or weight of the mixer structure, and is effective in operation in providing selective control of transfer of material from the main body into the extension.

It will be appreciated that alternative shapes and manners of mounting the movable diverter plate could be utilised. The lower edge of the plate could be provided with a hinged or other pivot joint, or there is also the possibility of forming the relevant section of the curved wall 12 to be sufficiently flexible to allow said angular movement by bending.

For some applications the selectively movable plate or equivalent portion of the body wall structure employed for said diversion may be in only a section of the body which is less in length than the body length of said zone, for example if the feed out rotor includes an auger section said diversion might operate only along the length of that section while allowing material to enter and leave the extension under the action of the feed out rotor in other section or sections of said zone during the mixing process and while the discharge door is closed. However it is preferred that the power required for effecting mixing is reduced by diverting most if not all of the material away from the feed out rotor during mixing so that the latter faster driven rotor is not under any substantial load while this process takes place.

A roof panel 48 (FIG. 1) is provided for further preventing material entering extension 22 during loading and mixing as referred to above. In this embodiment panel 48 is fixed though it could be removable and/or hinged e.g. to facilitate access to extension 22 and rotor 30 for maintences or repair. It extends longitudinally within body 10 co-extensively with the auger section of the feed out rotor and projects inboard from the upper part of the body wall over the top of extension 22 above said section of rotor 30 and slopes downwardly at an angle of about 60 deg. toward mixing rotor 16. For some applications said roof panel may extend over the full length of rotor 30.

It is usual practice to load body 10 with the ingredients in bulk using a tractor front end shovel which may deliver as much as 1 ton at a time. Roof panel 48 prevents entry of any of this as yet unmixed material into extension 22 or at least that part thereof occupied by the auger section of rotor 30. It also provides some measure of protection against damage if the body is overloaded by overfilling as the mass of material is largely prevented from reaching rotor 30 or at least said section thereof before start up, so that said rotor is not jammed particularly by forward transfer of material along extension 22 under the action of said rotor section before discharge is to be effected. Moreover any masses of material e.g. lumps or clods, which might tend to be carried upwards by the agitator bars 16 above the level of the rotor axes to fall outwardly in the upper region of extension 22, at least in the part occupied by said auger section, will be caught by panel 48 to slide back into the main bulk when a void occurs or the level of the mass on that side falls during the mixing action.

I claim:

1. Mixing apparatus comprising an open topped body to be loaded with bulk materials by way of an upper zone of a main part thereof, said main body part having a part cylindrical lower zone defined by a curved floor and wall structure centered on a first longitudinal axis; a main mixing rotor driven about said axis in a cylindrical envelope of revolution in close proximity to said floor and wall structure to provide a tumbling, stirring or mixing action on said materials in said main part in use; a laterally projecting extension above the level of said axis and to that side at which material is operatively driven upwardly by action of the mixing rotor; a feed out rotor within said extension to act on material passing thereinto from said main part; and a discharge opening in or along said extension which can be selectively opened for dispensing of material laterally of the body by the action of the feed out rotor: wherein the improvement comprises providing a portion of said body wall structure in a longitudinal zone of the body in which the inboard side of the extension is open to the main part of the body to receive such material on transfer for discharge, said wall structure portion having an upper edge immediately adjacent to the bottom of the extension, which is selectively angularly movable between a first position in close proximately to the envelope of revolution of the mixing rotor and a second position at which it is more remote from said envelope, whereby with said portion at the first position material swept round the body by the mixing rotor is substantially directed past the extension and out of reach of the feed out rotor so that it remains in a main part of the body for further mixing, and at the second position said material is substantially urged into the extension and towards the feed out rotor to be acted on thereby.

2. Apparatus as in claim 1 wherein said body wall portion is a deflector plate pivoted or otherwise located for angular movement about an axis coincident with or constituted by its lower edge, and mounted so that its inner face lies flush with the remainder of the body wall therebelow.

3. Apparatus as in claim 1 wherein said body wall portion is constituted by an integral part of the main body wall which is flexed to effect said movement.

4. Apparatus as in claim 1 wherein said deflector plate includes a laterally projecting lip which overlies the margin of a floor portion of the extension at both positions to resist escape of material at the junction with said floor.

5. Apparatus as in claim 1 including power actuated camming means acting on an upper part of said body wall portion externally of the body for selective angular movement thereof.

6. Apparatus as in claim 1 wherein the mixing rotor is shaped to operate on the material without any substantial component of longitudinal movement or transfer of the material along the body towards either end thereof of the in that the extension is open to the main part of the body along the full length thereof.

7. Apparatus as in claim 1 wherein the discharge opening extends along part only of the length of the extension, and in that the feed out rotor is shaped to transfer material within the extension longitudinally to said opening on discharge.

8. Apparatus as in claim 1 including a roof panel operatively mounted along an upper part of the extension within the body over the feed out rotor and angled to slope downwardly towards the mixing rotor.

* * * * *

UNITED STATES PATENT AND TRADEMARK OFFICE
CERTIFICATE OF CORRECTION

PATENT NO.   : 5,061,081
DATED        : October 29, 1991
INVENTOR(S)  : Charles E. Walley It is certified that error appears in the above-identified patent and that said Letters Patent is hereby corrected as shown below:

Column 2, line 36, change "talk" to -- taking --.

Column 3, line 34, change "application" to -- applications --.

Column 4, line 30, change "outermot" to -- outermost --.

Column 5, line 6, change "maintences" to -- maintenance --.

Column 6, line 8, change "proximately" to -- proximity --; line 40, change "of the" to -- and --.

Signed and Sealed this

Sixteenth Day of February, 1993

Attest:

STEPHEN G. KUNIN

*Attesting Officer*  *Acting Commissioner of Patents and Trademarks*